United States Patent [19]

Masuzima et al.

[11] 4,062,719
[45] Dec. 13, 1977

[54] APPARATUS FOR STORING INFORMATION MATERIAL IN CASSETTES

[75] Inventors: Sho Masuzima; Shuhei Yoshida; Toshiyuki Yaguchi; Tetsuya Fuchiguchi, all of Tokyo, Japan

[73] Assignee: Tokyo Denki Kagaku Kogyo Kabushiki Kaisha, Japan

[21] Appl. No.: 673,064

[22] Filed: Apr. 2, 1976

[30] Foreign Application Priority Data

Apr. 4, 1975 Japan ................................. 50-40997

[51] Int. Cl.² .......................................... B65H 21/02
[52] U.S. Cl. ..................... 156/502; 156/506
[58] Field of Search ..................... 156/502, 505, 506; 242/56 R, 181

[56] References Cited

U.S. PATENT DOCUMENTS

| B 535,448 | 3/1976 | King | 156/502 X |
|---|---|---|---|
| 3,737,358 | 6/1973 | King | 156/502 |
| 3,753,834 | 8/1973 | King | 156/506 |
| 3,762,619 | 10/1973 | Leavitt et al. | 156/497 X |
| 3,814,343 | 6/1974 | Bennett et al. | 242/56 R |
| 3,848,825 | 11/1974 | Zielke | 156/502 X |

Primary Examiner—Charles E. Van Horn
Assistant Examiner—W. H. Thrower
Attorney, Agent, or Firm—Steinberg & Blake

[57] ABSTRACT

An apparatus for manufacturing from a cassette which initially has a continuous leader extending between and connected to a pair of rotary hubs thereof and from an elongated flexible information material carrying information which can be extracted from the material a cassette which has a length of the information material stored in the cassette with opposed ends of the information material connected with leaders which are respectively connected to the rotary hubs of the cassette. A transfer structure operates to extend an initially relatively short loop of the continuous leader into a relatively long loop extending from the cassette to a holding structure which holds the leader as well as the information material and which is capable of assuming a pair of splicing positions in which after the continuous leader is cut into separate leaders a leading end of a length of information material is spliced to one of the leaders and a trailing end of the length of information material is spliced to the other of the leaders, with the length of information material and the leaders connected to the opposed ends thereof being wound into the cassette. The above operations can be rendered fully automatic particularly by reason of the transfer structure which extends the initially continuous leader from the cassette to the holding structure where the splicing operations are carried out.

11 Claims, 25 Drawing Figures

FIG-7
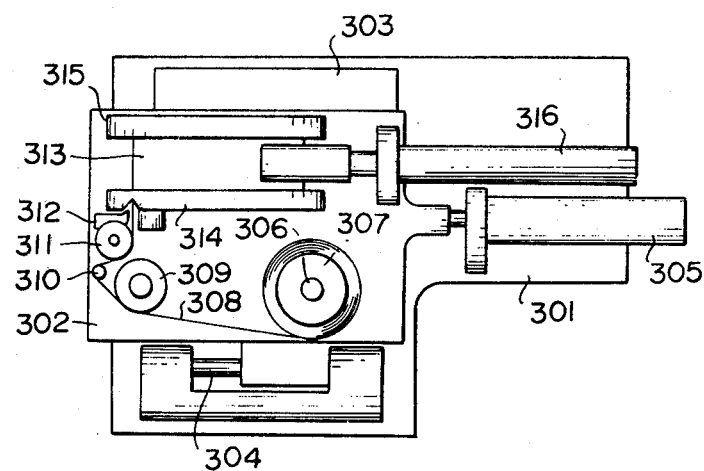
FIG-8-A
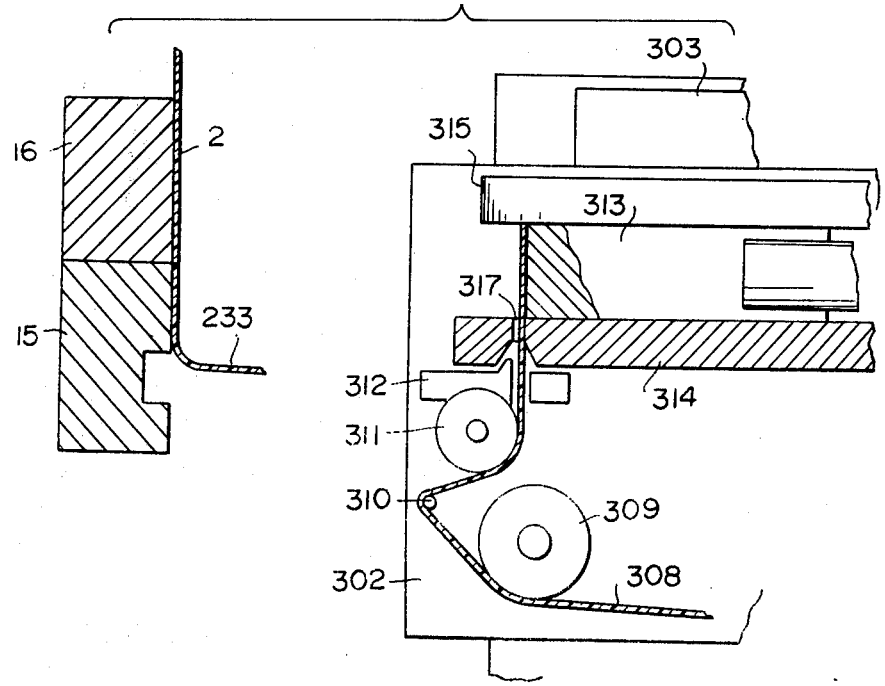

FIG-8-B
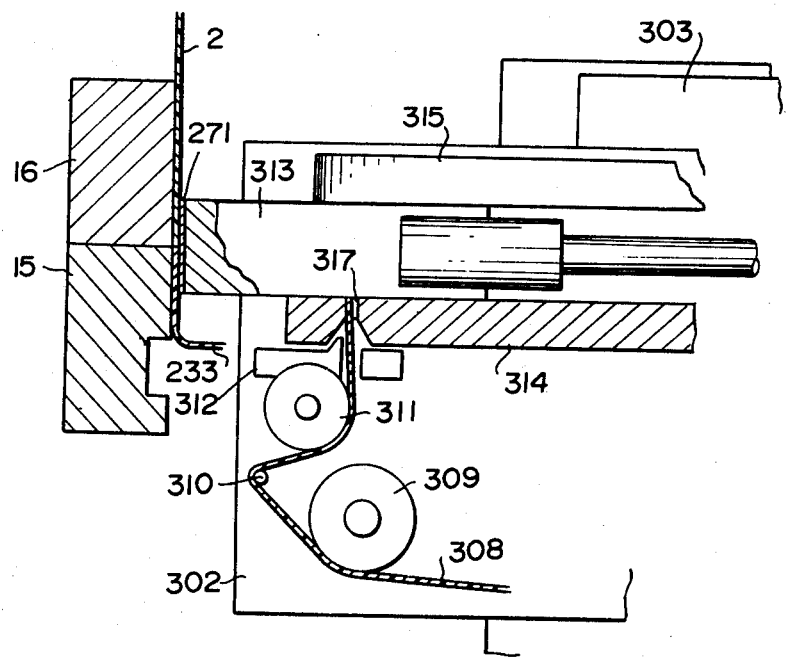

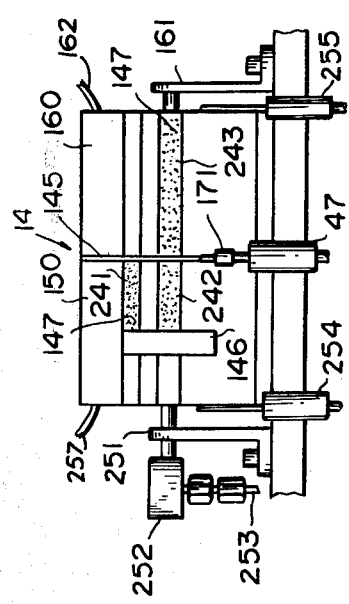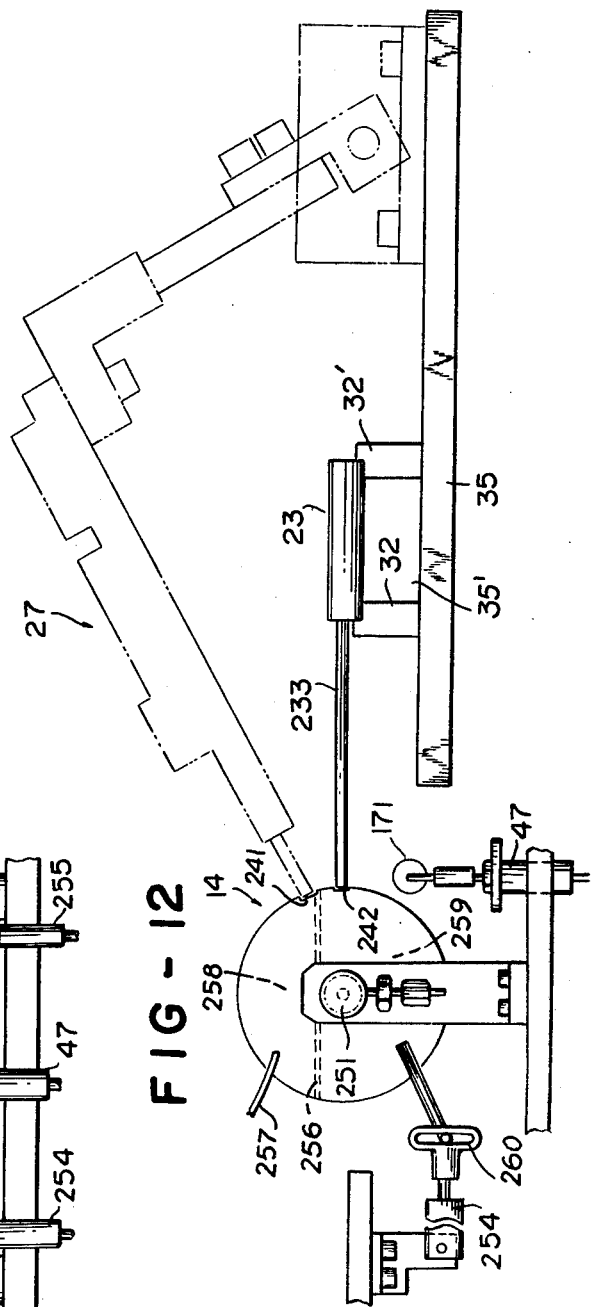

APPARATUS FOR STORING INFORMATION MATERIAL IN CASSETTES

BACKGROUND OF THE INVENTION

The present invention relates to winding machines and in particular to apparatus for winding into a cassette a length of information material, such as a magnetic tape, film strip, or the like, with opposed ends of this length of material connected with leads which in turn are connected with rotary hubs of the cassette.

While apparatus of the above general type is known, the known apparatus suffers from several drawbacks. Thus, the known apparatus does not have the possibility of full automation. For example, in the known apparatus the initially continuous leader which is connected at its ends to the rotary cassette hubs must be manually withdrawn from the cassette and placed in engagement with a structure where splicing operations go forward. In addition, the known apparatus of the above general type is extremely complex and expensive while also being incapable of operating at high speed, so that because of this lack of high speed operating capability and necessity of certain manual operations the output of the known apparatus is relatively small and the cost involved in providing cassettes with information material stored therein is undesirably great.

In order to withdraw the initially continuous leader from the front opening of the cassette case, then to cut the continuous leader into separate leaders and then to splice the information material at its opposed ends to the separate leaders, by way of a suitable splicing material such as adhesive tape, for example, it is necessary with the known apparatus to withdraw the continuous leader manually while giving the leader a twisted or reversed position so that the information material and leaders will then be capable of being properly wound into the cassette. Operations of this type required by the prior art represent bottlenecks with respect to the achievement of full automation of the winding apparatus. Even if it were possible to provide full automation for such apparatus, the apparatus when following the teachings of the prior art would be extremely complex, providing a serious obstacle to high-speed automatic winding of information material into the cassette.

A further drawback of the known structures resides in the fact that the information-carrying side of the information material easily becomes damaged. Thus, during splicing operations the information material and the leaders are conventionally held by suction against a holding structure. Thus, in the case of magnetic tape capable of carrying sound-producing signals the side of the tape which carries these signals is in engagement with the holding structure while the opposite side receives the splicing tape. The same is true of film strips where the emulsion side which has been exposed engages the holding structure while the opposite non-emulsion side receives the splicing material. The holding structure conventionally includes metallic plates or strips which are formed with openings passing therethrough so that by way of suction applied to such plates or strips the information material and the leaders can be held in engagement with the holding structure while the splicing operations go forward. Because the suction acts only through these separate openings which are spaced from each other, the information material cannot be uniformly held against the holding structure. The force at the openings themselves is quite large while between the openings there is practically no holding force, so that a non-uniform holding action is provided with possible fluttering and undesirable vibratory movement of the material occurring, and at the same time when the material is moved along such holding strips or plates the information-carrying side of the material can easily be damaged to distort the information which is stored in and extracted from the information material.

A further drawback of the prior art apparatus resides in the fact that the various components thereof are undesirably spread apart from each other so that a large space is required by the prior art structures, whereas relatively compact assemblies are much more desirable.

SUMMARY OF THE INVENTION

It is accordingly a primary object of the present invention to provide a winding apparatus which will avoid the above drawbacks.

It is in particular an object of the present invention to provide an apparatus of the above general type which is fully automatic.

Furthermore, it is an object of the present invention to provide an apparatus of this type which while being fully automatic at the same time is capable of storing in cassettes information material of uniform high quality which is not deleteriously influenced by the apparatus of the invention.

Also, it is an object of the present invention to provide an apparatus of the above type which can operate at high speed without requiring the presence in the cassette of wound material which will serve no useful function.

It is also an object of the present invention to provide the capability of miniaturizing to a large extent the automatic winding apparatus, considered in its entirety.

The apparatus of the present invention is capable of manufacturing, from a cassette having a continuous leader extending between and connected to rotary cassette hubs and from a supply of elongated flexible information material which carries information capable of being extracted from the material, a cassette which has separate leaders respectively connected with the rotary hubs thereof and a length of the information material opposed ends of which are connected with these leaders, respectively. A cassette-support means is provided for supporting a cassette which initially has the continuous leader extending between and connected to the rotary hubs thereof. An information material supply means is provided for supplying the information material lengths of which are respectively to be stored in the cassettes. A guide means has components situated along a predetermined path extending from the supply means to the support means for guiding the information material along this path from the supply means to the support means during travel of the information material into the cassette while being coiled around a hub thereof. A holding means is located at a splicing station which is situated along the above path for temporarily holding a portion of the information material and a portion of the leader, this holding means has a leading splicing position where a leading end of a length of the information material is in alignment with an end of a separate leader connected with one of the cassette hubs and a trailing splicing position where a trailing end of the length of information material is in alignment with an end of a separate leader connected to the other hub of the cassette. A transfer means is movable along a second path extending between the cassette-support means and the splicing station for transferring a loop of a continuous leader to form a cassette at the support means to the holding means to be temporarily held thereby while the holding means is in its trailing splicing position and while the holding means holds a leading end of the information material which has traveled along the above predetermined path up to the holding means. A cutting means is situated adjacent the splicing station for cutting the continuous loop held by the holding means into separate leaders respectively connected with the rotary hubs of the cassette. This holding means then changes from its trailing splicing position to its leading splicing position in order to situate the leading end of the information material in alignment with an end of one of the leaders which extends to one of the rotary cassette hubs. A splicing means which is situated in the region of the splicing station splices the leading end of the information material to this one leader. The holding means then releases the length of information material at its leading end and the one leader to which it is spliced so that this one leader and the information material can be wound into the cassette which is at the support means until the trailing end of the length of information material reaches the holding means. During this time the holding means continues to hold the other leader which extends to the other hub. When the trailing end of the information material wound into the cassette reaches the holding means, the latter temporarily holds this trailing end of the length of information material and the cutting means cuts the information material at the holding means to separate the trailing end of the length of information material already wound into the cassette from the leading end of the next length of information material. The holding means then returns to its trailing splicing position for aligning the trailing end of the length of information material already wound into the cassette with the other leader which is still held by the holding means, and at this time the leading end of the next length of information material remains held by the holding means. The splicing means then splices the trailing end of the length of information material already wound into the cassette to this other leader, whereupon the holding means releases the latter leader and the trailing end of the information material spliced thereto for completion of the winding of the information material and the other leader into the cassette. At the same time the leading end of the next length of information material was held at the holding means in readiness to be connected with a leader of another cassette during a repetition of the above operating cycle.

BRIEF DESCRIPTION OF DRAWINGS

The invention is illustrated by way of example in the accompanying drawings which form part of this application and in which:

FIG. 7 is a plan view of the splicing means;

FIG. 8A shows in a fragmentary schematic partly sectional view the relationship between the splicing means and holding means when a splice is about to be effected;

FIG. 8B shows the structure of FIG. 8A during actual splicing;

FIG. 11 is a fragmentary schematic illustration of another embodiment of a holding means of the invention; and FIG. 12 is a schematic side elevation of the holding means of FIG. 11 shown together with the cassette-support means and the splicing means which is shown in phantom lines.

DESCRIPTION OF PREFERRED EMBODIMENTS

In the description which follows, by way of specific examples of the invention reference is made to the winding of an information material in the form of magnetic tape capable of carrying sound signals. However it will be understood that the invention is equally applicable to other forms of information material such as film strips which also can be wound into cassettes with ends of the film strip connected to leaders which extend to rotary cassette hubs. Furthermore, the invention is applicable to information material of the above type either before the information is provided on the material or after the information is on the material. Thus, in connection with magnetic tape, the invention is applicable to a supply of magnetic tape having thereon successive lengths each of which carries a sound recording of a given piece of music so that the successive pieces of music, all of which may be identical, can be successively stored in successive cassettes. In the same way, previously exposed film strips can be stored in cassettes with the structure of the invention. However, it is to be understood that the invention is also applicable to blank magnetic tapes and to unexposed film strips which can be stored in cassettes in preparation for having information carried thereby. Thus the blank magnetic tape stored in the cassette can have any desired sound recorded thereon in a well known manner while an unexposed film strip can of course be situated with the cassette in a suitable camera to be exposed therein.

Figure 1:
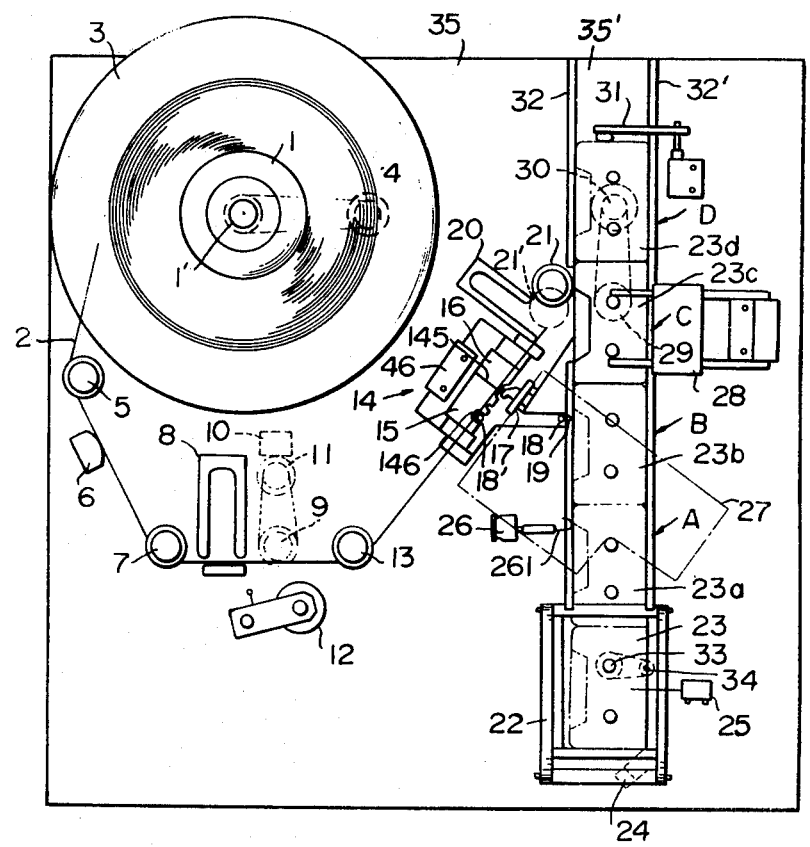
FIG. 1 is a schematic plan view of the entire apparatus according to one embodiment of the invention.

Referring now to FIG. 1, in the schematic plan view of an apparatus according to the invention illustrated therein, there is shown a supply means for supplying the information material, this supply means including the rotary hub 1 on which the information material in the form of magnetic tape 2 is wound, this magnetic tape 2 either having prerecorded material thereon or being blank. The supply means includes a reel pad 3. A motor 4 is schematically illustrated in dotted lines operatively connected through a timing belt with a rotary shaft 1' connected with the rotary hub 1, this motor serving to apply a certain back tension in order to maintain a predetermined fixed tension in the magnetic tape 2 during travel thereof from the supply means.

A guide means is provided for guiding the magnetic tape from the supply means along a predetermined path. Components of the guide means include the guide rollers 5, 7, and 13 supported on suitable bearings and serving to guide the tape 2 along the illustrated predetermined path into a cassette, as described below, with the tape 2 traveling in a stable manner along the path determined by this guide means.

Situated along that part of the path which extends between the rollers 5 and 7 is a magnetic read head 6 situated close to the magnetic tape 2 for the purpose of detecting the "Q" signal recorded on the magnetic tape 2 and for responding to this signal in order to control the travel of the magnetic tape, such as, for example, in order to stop the travel of the magnetic tape when this signal is detected by the magnetic head 6. Thus, as is well known, certain information such as a given piece of music, for example, may be successively recorded along successive lengths of the tape 2 with the "Q" signal indicating when the given piece of music ends on one length of the tape while the same piece of music, for example, may again be repeated on the next length of tape. Thus the magnetic head 6 is capable of picking up from the magnetic tape a signal which indicates when the starting and end points of the successive lengths of the tape have reached the magnetic head 6.

Situated along the path of travel of the tape 2 are a pair of vacuum suction devices 8 and 20 which function to take up slack which may form in the tape during starting or stopping thereof.

Also, a capstan 9 is situated along the path of travel of the tape as shown in phantom lines in FIG. 1. The capstan 9 is operatively connected with a driving motor 11 by way of a suitable timing belt. This capstan 9 functions to hold the magnetic tape pressed against a pinch roller 12 which can be displaced from the position shown in FIG. 1 toward the capstan 9 so as to hold the tape between the capstan 9 and the pinch roller 12, the capstan serving in a known way to regulate the traveling speed of the tape, maintaining this traveling speed at a constant value. A measuring device 10 is operatively connected with the rotary shaft of the capstan driving motor 11 so as to be capable of measuring the length of the traveling magnetic tape, as may be required.

Figure 2:
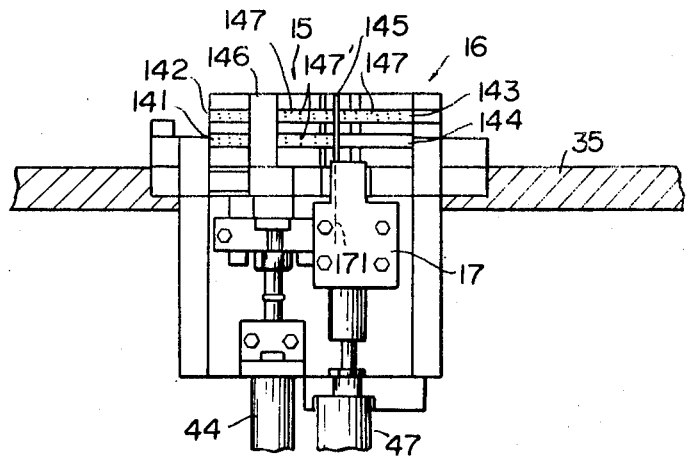
FIG. 2 is a partly sectional and partly fragmentary elevation of the holding means of the invention.

The portion of the predetermined path along which the tape 2 travels beyond the guide roller 13 is substantially straight, and along this portion of the path of travel is a splicing station where a holding means 14 is located. The details of the holding means 14 of the invention are shown more clearly in FIG. 2. Thus, as the tape 2 travels to the splicing station it will first pass a holding member 15 of the holding means 14 and then pass a holding member 16 of the holding means 14, the member 16 being situated subsequent to the member 15 along the path of travel of the tape. The holding member 15 is formed in its front face which is visible in FIG. 2 with a groove or guideway 141 which receives the tape 2. Above the guideway 141 the member 15 is formed with a second groove or guideway 142 which is parallel to the guideway 141, as is apparent from FIG. 2. The surface of the member 15 which is formed with these guideways 141 and 142 normally is perpendicular to a plane occupied by a panel 35 which carries the components illustrated in FIG. 1. The second member 16 of the holding means 14 is spaced only slightly beyond the member 15, defining a gap 145 therewith, and the front face of the member 16 which is visible in FIG. 2 is in the same plane as the front face of the member 15 which is visible in FIG. 2. This front face of the member 16 is formed with a groove or guideway 143 which forms an extension of the guideway 142 in the position of the holding means shown in FIG. 2. Below this guideway 143 the member 16 is formed with an additional guideway 144 which forms an extension of the guideway 141 in the position of the parts shown in FIG. 2, and thus it will be seen that the guideways 143 and 144 are also parallel to each other and parallel, in the same way as the guideways 141 and 142, to the plane occupied by the panel 35, the surface of member 16 which is formed with the guideways 143 and 144 normally being perpendicular to the plane occupied by the flat panel 35.

Thus, in the position of the parts shown in FIG. 2, the guideways 141 and 142 are respectively in alignment with the guideways 144 and 143. The holding means 14 is capable of assuming either a leading splicing position or a trailing splicing position, both of these positions being described in greater detail below, and for this purpose in the description which follows the member 15 is movable with respect to the member 16, but it will be clear that it is also possible to provide an arrangement where the member 16 is movable with respect to the member 15, if desired.

At the innermost parts of the guideways 141, 142, and 143 the members 15 and 16, which are hollow and communicate with the suitable sources of suction, as described below, carry holding strips or plates 147 provided with suction pores 147' through which the suction in the interiors of the members 15 and 16 operates to hold the tapes in the guideways by suction.

Situated at the splicing station adjacent the holding means 14 is a cutting means 17 capable of cutting either a leader or the magnetic tape 2. As is apparent from the schematic illustration of FIG. 2, the cutting means 17 includes a cutting blade 171 which is capable of extending into the gap 145 and which is operated by way of a pneumatic cylinder-and-piston assembly 47, the latter being acutated to displace the blade 171 first from a rest position across tapes which bridge the gap 145 and then back to the rest position.

The panel 35 carries an elongated bar 35' which forms a cassette-support means, this bar 35' having at its edges lips 32 and 32' which engage front and rear surfaces of the cassettes to guide the latter for movement along the support means 35'.

A transfer means is provided for transferring a leader loop from a cassette at the loop-extending position B shown in FIG. 1 to the holding means 14, in a manner described in greater detail below. This transfer means includes a loop-transfer pin 18 which is movable along a second path to the left from the support means 35' in FIG. 1 toward the holding means 14, with this pin 18 during such movement serving to extend the loop which extends from the cassette 23b which is shown at the loop-extending position B in FIG. 1. This transfer means includes in addition to the loop-extending pin 18 a holding pin 19 which serves to hold the loop during shifting of a cassette from the position B to the winding position C shown for the cassette 23c in FIG. 1. As will be apparent from the description below, the leader initially extends continuously between rotary hubs of each cassette, and it is this continuous leader which has a loop thereof extended by the pin 18 of the transfer means from the support means 35' to the left, as viewed in FIG. 1, to the holding means 14 to be situated in a groove 146 of the member 15, the pin 18 being shown at position 18' which it reaches at the end of the loop-extending operation. As is apparent from FIG. 2, this groove 146 extends perpendicularly across the guideways 141 and 142. Before reaching the loop-extending position B, a cassette is first situated in the loop-extracting position A where a relatively short leader loop is extracted from the cassette, and it is this relatively short loop which is extended by the pin 18 as the latter travels to the position 18' for situating the extended loop in the groove 146. When the holding members 15 and 16 have the position shown in FIG. 2, the guideways 142 and 143 thereof are at the same elevation as the leader in the cassette at the position B shown in FIG. 1, so that the pin 18 serves to place the leader in the groove 146 at the elevation of the guideways 142 and 143. Then while the pin 18 remains at the position 18' holding the loop in the groove 146, a cassette-moving means serves to move the cassette 23b shown at the position B in FIG. 1 to the winding position C where the cassette 23c is illustrated in FIG. 1, and as a result the leader becomes extended from the pin in the position 18' along the guideways 142 and 143 and beyond the holding means to the cassette which is shown at the position C in FIG. 1.

Figure 3:
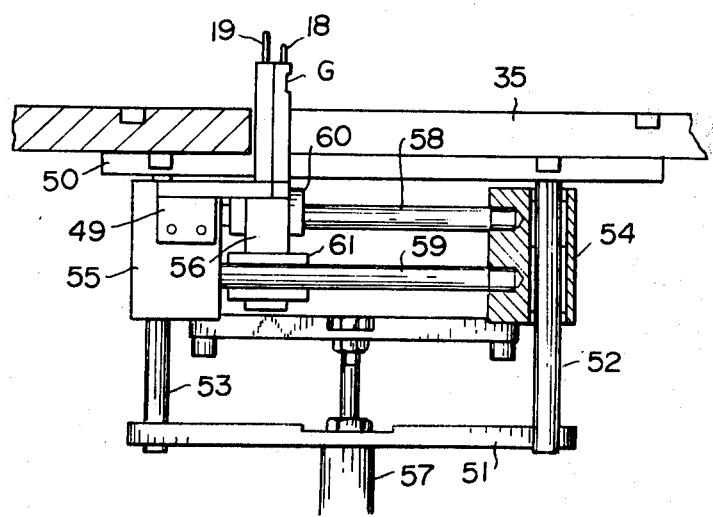
FIG. 3 is a partly sectional elevation of a transfer means of the invention for extending a leader loop.

The details of the transfer means are illustrated in FIG. 3. The section of FIG. 3 is taken in a plane which is perpendicular to the plane of FIG. 1 and which is contained in the path traveled by the pin 18 during the loop-extending operation. This pin 18 is mounted on a slidable carrier 56 supported by bearings 60 and 61, ball bearings, for example, which respectively surround and are movable along parallel shafts 58 and 59. These shafts extend parallel to the panel 35. Between the starting position of the pin 18 shown in FIGS. 1 and 3 and the splicing station where the holding means 14 is located the panel 35 is formed with a slot through which the carrier for the pin 18 can freely move. A pneumatic means 49, in the form of a suitable cylinder and piston assembly, is operatively connected with the carrier 56 for displacing the latter back and forth along the shafts 58 and 59. These shafts 58 and 59 are in turn mounted at their ends on blocks 54 and 55 which are formed with throughbores having therein suitable bearings. The shafts 52 and 53 extend through these throughbores of the slide-blocks 54 and 55. The shafts 52 and 53 are fixedly carried at their top ends by a plate 50 which is fixed to the lower surface of panel 35, as viewed in FIG. 3, while the bottom ends of the guide shafts 52 and 53 are fixed to a transverse plate 51. The holding pin 19 of the transfer means is directly carried by the block 55 so that it is capable of moving only with the block 55 as the latter moves back and forth along the shaft 53. A pneumatic means 57 in the form of a suitable piston-and-cylinder assembly is operatively connected with a bar extending between and fixed to the slide blocks 54 and 55 for raising and lowering the latter so that in this way the structure which includes the several guide blocks and shafts as well as the pair of pneumatic means 49 and 57 forms a pin-moving means of the transfer means. The throughbores of the blocks 54 and 55 may be provided with suitable ball bearings, for example, to facilitate movement of these blocks 54 and 55 along the shafts 52 and 53, respectively. By way of the pneumatic means 57 it is possible for the pins 18 and 19 to be raised from lower rest positions, where they are situated beneath the top surface of the panel 35, to upper starting positions, respectively, in which the pins 18 and 19 are shown in FIG. 3. When moving up to this starting position, these pins 18 and 19 will enter into a relatively short loop provided by way of the loop-extractor means 26 which is shown in FIG. 1 and described below. That surface of the pin 18 is directed toward the splicing station where the holding means 14 is situated is formed with a transverse groove G, and the leader is situated in this groove so that in this way pin 18 serves to securely hold the extended leader loop in the groove 146 when the pin 18 reaches the position 18' with the tip of the loop when initially displaced into the groove 146 engaging only the in 18 in the groove G thereof without actually contacting the member 15.

Figure 4:
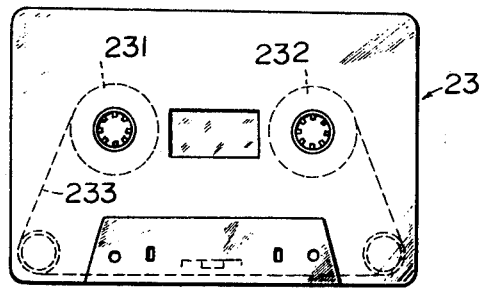
FIG. 4 shows in elevation a cassette in the condition it has when received by the apparatus of the invention.
Figure 5:
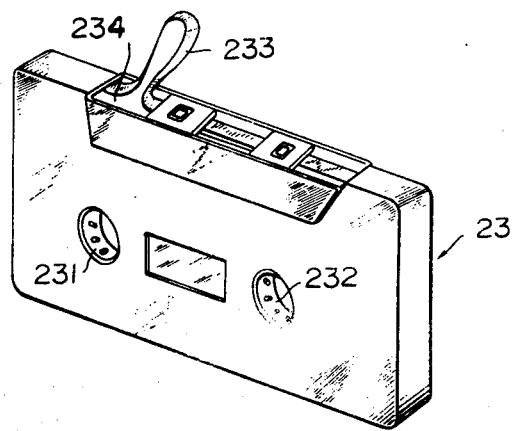
FIG. 5 is a perspective view of the cassette of FIG. 4 after a relatively short leader loop has been extracted from the cassette.

Referring now to FIGS. 4 and 5, it will be seen that a cassette 23 initially has the condition shown in FIG. 4 where a continuous leader 233 has its opposed ends connected with the pair of rotary cassette hubs 231 and 232. Thus, in the initial condition shown in FIG. 4 the continuous leader 23 is situated entirely within the cassette case together with the hubs 231 and 232. The leader 233 is guided in the manner shown in FIG. 4 so as to extend across the front opening of the cassette case. The cassette 23 is shown in FIG. 5 in the condition where the leader 233 has been drawn from the front opening 234 of the cassette case to an extent sufficient to provide the relatively small leader loop shown in FIG. 5.

Assuming that the panel 35 is horizontal in the position shown in FIG. 1, a magazine means 22 is situated at the entrance end to the cassette-support means 35', and a vertical stack of cassettes 23 having the condition shown in FIG. 4 are situated in the magazine 22, with the lowermost cassette situated at the elevation of the surface of the cassette-support means 35' which extends between the guide lips or flanges 32 and 32' thereof. This structure is shown in cross section in FIG. 6. A cassette-moving means is formed by a turnable lever 24 shown schematically in FIG. 1. This lever 24 is capable of being turned and longitudinally displaced along the support means 35' in such a way that the lowermost cassette is moved by the lever 24 out of the magazine 22 into the loop-extracting position A where a cassette 23a is shown in phantom lines in FIG. 1. Of course as each lowermost cassette 23 reaches the position 23a, the cassettes above the lowermost cassette will move down so that the next lowermost cassette is in the position to be displaced into the position A shown occupied by the cassette 23a in FIG. 1. Instead of a cassette-moving means in the form of the lever 24 it is also possible to provide an automatically operable system where the cassettes are pushed out of the magazine one by one by way of a suitable push rod actuated by a piston situated in a cylinder which receives air under pressure, so that a pneumatic cassette-moving means is provided. A suitable microswitch 25 is situated in the path of movement of each cassette from the magazine 22 into the position A. This microswitch 25 is thus capable of detecting when the magazine 22 is empty. As long as the switch 25 detects the presence of a cassette at the lower end of the stack in the magazine 22, the apparatus will continue to operate automatically. However, when the switch 25 responds to the lack of a cassette in the magazine, the switch 25 will automatically terminate the operation of the apparatus. When each cassette is in the lowermost position in the magazine 22 in line with the cassettes which are distributed along the support means 35', a rotary drive shaft 33 is received in the hub 231 of each cassette. Thus, this drive shaft 33 is capable of being displaced upwardly into the lowermost cassette and then retracted downwardly therefrom. When the shaft 33 is displaced upwardly into a cassette at the bottom of the stack in the magazine 22, the shaft 33 is capable of being driven from a motor 34 by way of a suitable timing belt, and through the shaft 33 the leader is taken up so as to avoid any slack in the leader when a cassette is displaced out of the magazine. The motor 34 operates through a suitable slip clutch which assures that the drive will take up any slack in the leader, and after a short interval of operation the shaft 33 is retracted downwardly out of the hub 231 so that the cassette is then in a condition to be displaced to the position A. It is also possible to provide an arrangement where the lowermost cassette is first dropped down so as to engage with the shaft 33 to have the slack, if any, in the leader taken up and then raised pneumatically to the elevation of the surface of the support means 35 where the several cassettes 23a, 23b, 23c, and 23d are located, as shown in FIG. 1, in preparation to be moved by the moving means 24 as described above.

The loop-extracting means 26 is capable of operating on a cassette at the loop-extracting position A for drawing the leader out of the cassette to an extent sufficient to provide a relatively small loop projecting from the cassette. In this way each cassette reaching the position B, shown for the cassette 23b in FIG. 1, will have the relatively small loop into which the pins 18 and 19 of the transfer means can enter as described above. For this purpose the extracting means 26 includes a hook-shaped pawl element 261 which can enter into the cassette opening 234 behind the leader extending across the opening 234, the pawl 261 then being moved to the left, as viewed in FIG. 1, in order to extract the relatively small leader loop from the cassette. This extracting means 26 is capable of providing the relatively small loop for the leader 233 as shown in FIG. 5. This loop is withdrawn from the cassette case only through a distance of approximately 20 mm. The pawl 261 has the hook-shaped part which is turned to extend into the space behind the part of the leader which extends across the opening 234, and then the element 261 is withdrawn to the left, as viewed in FIG. 1, in order to extract the loop to provide an arrangement as shown in FIG. 5. For this purpose the extracting means 26 may include a rotary solenoid capable of turning and displacing the element 261 so as to effect the loop-extracting operation without damaging the leader.

At the vicinity of the winding position C for a cassette such as the cassette 23c shown in FIG. 1, the guide means includes a movable guide roller 21 capable of being moved between the solid line position shown in FIG. 1 and the dotted line position 21'. Only during actual winding of the tape 2 into the cassette at the position C is the roller 21 shifted through a suitable unillustrated mechanism to the position 21' so as to assure smooth winding of the tape without rubbing thereof against an edge of the cassette case which defines the opening 234. Thus, there is no possibility of damaging the information material while it is wound into the cassette.

Figure 6:
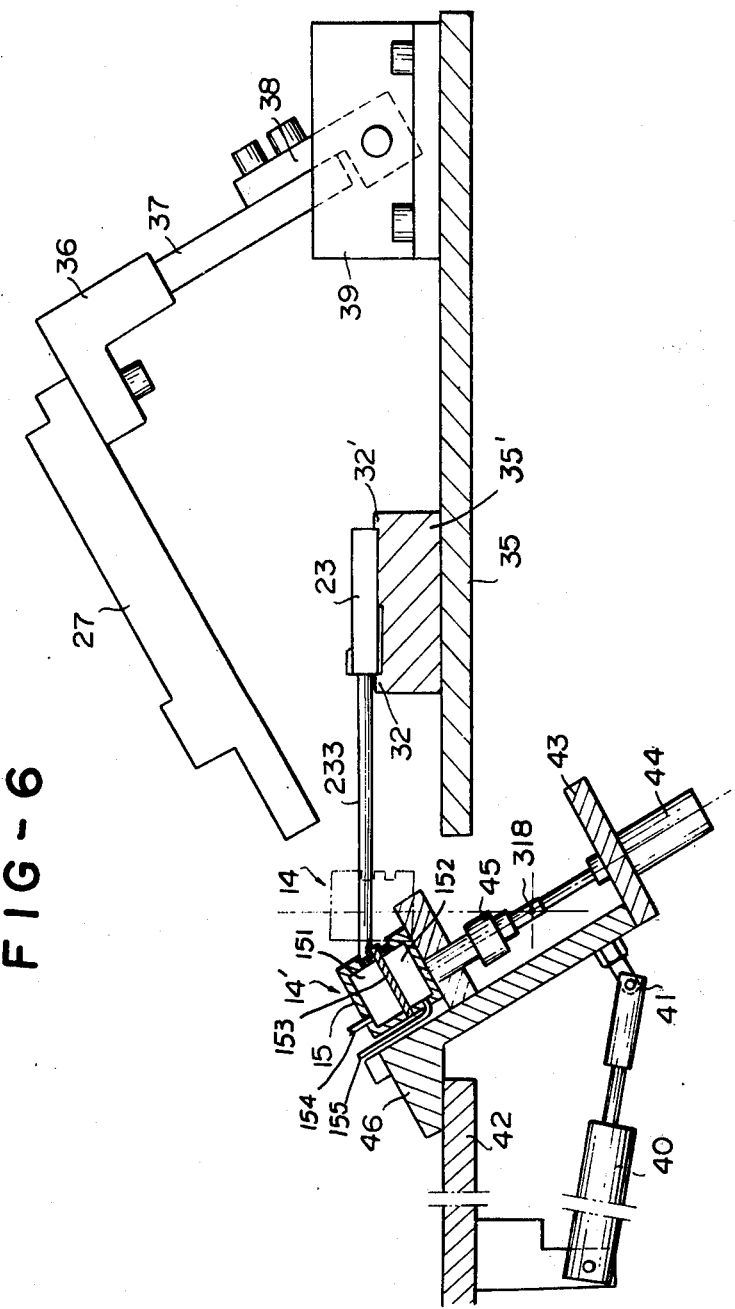
FIG. 6 is a partly fragmentary and partly sectional schematic illustration of the splicing means, cassette-support means, and holding means of the invention, with the holding means shown in a splicing attitude.
Figure 9A:
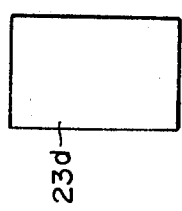
FIG. 9 is a diagrammatic illustration of successive operating positions of a cassette during an operating cycle.
Figure 9B:
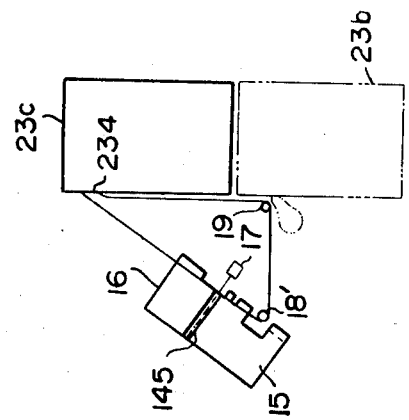
Figure 9C:
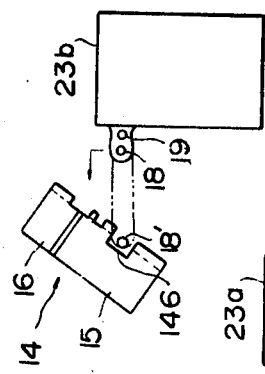
Figure 9D:
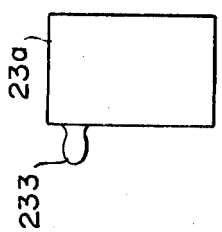
Figure 9E:
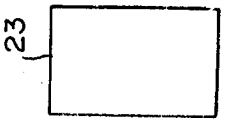
Figure 10A:
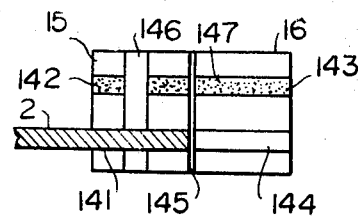
FIG. 10 schematically illustrates the different positions taken by the holding means during an operating cycle.
Figure 10D:
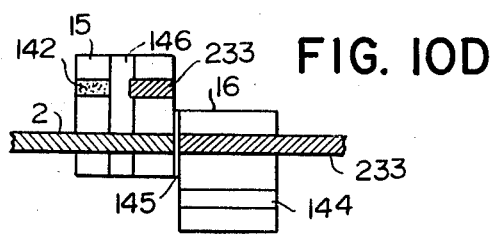
Figure 10B:
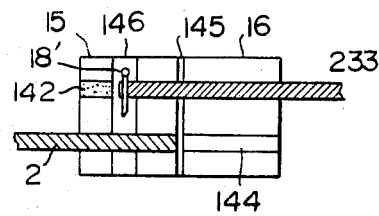
Figure 10E:
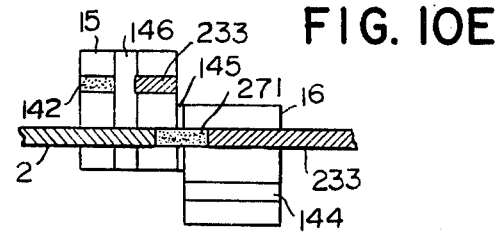
Figure 10C:
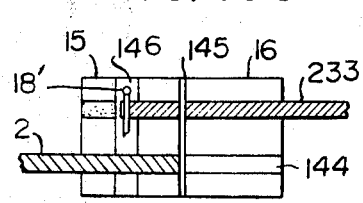
Figure 10F:
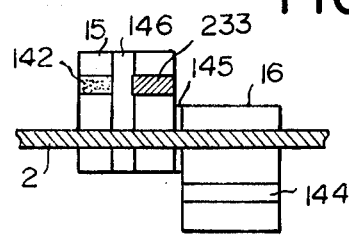
Figure 10G:
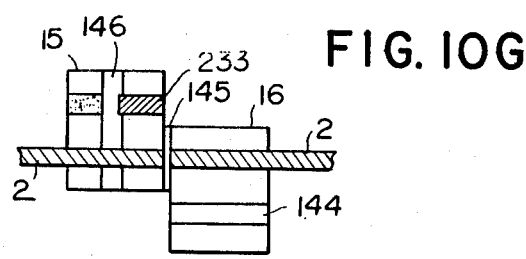
Figure 10H:
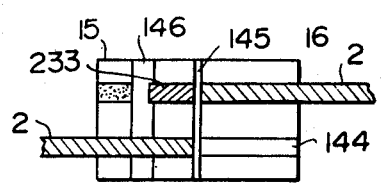
Figure 10I:
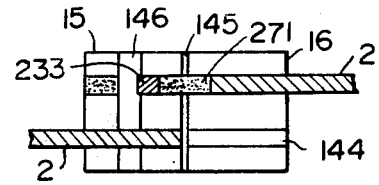

The splicing means 27 which is shown in phantom lines in FIG. 1 is capable of supplying to the tape and leader ends which are to be spliced together a short piece of adhesive tape, for example, which is pressed against these ends so as to splice them to each other. The splicing means 27 serves to cut a short piece of adhesive tape from a supply roll thereof, to feed the short piece of adhesive tape to the holding means 14, and to splice the aligned ends of the magnetic tape and leader together in a manner described in greater detail below. As is shown in FIG. 6, the splicing means 27 is carried by a bracket 36 which is fixed to an arm 37. This arm 37 is turnably connected with a second arm 38 which in turn is turnably connected with a bracket 39 fixed to the panel 35. The splicing means 27 can be turned with respect to the bracket 36, the arm 37 can be turned with respect to the arm 38, and the latter can be turned with respect to the bracket 39, so that in this way it is possible precisely to adjust the position of the splicing means 27 which is inclined with respect to the plane occupied by the panel 35 in the manner shown in FIG. 6. This angle of inclination can be adjusted through the above supporting structure 36–39. It will be noted from FIGS. 1 and 6 that the splicing means 27 extends over the cassette-support means 35 with the latter situated between the splicing means 27 and the panel 35, so that in this way an exceedingly compact arrangement is provided.

FIG. 6 shows the holding means 14 in phantom lines in the position normally occupied by the holding means, with the guideways 141 and 142 of the member 15 as well as the guideways of the member 16 situating tapes therein in a plane perpendicular to the plane occupied by the panel. However, the holding means 14 is capable of being tilted in the example of FIG. 6 from the normal phantom line position to the inclined attitude illustrated in solid lines in FIG. 6 where the holding means 14 has assumed the position 14' which is the splicing position. In the position 14' the guideways of the members 15 and 16 situate the tapes therein in a plane which is inclined to the plane occupied by the panel 35 and which is perpendicular to the plane occupied by the splicing means 27, so that the latter will advance the splicing tape, in the manner described below, along a path which is perpendicular to the plane occupied by the tape ends which are to be spliced to each other.

Referring now to FIG. 7, the splicing means 27 includes a base 301 on which a carriage 302 is slidable, this carriage being guided for movement between a guide bar 303 and a guide rod 304. A pneumatic piston-and-cylinder assembly 305 is carried by the base 301 and operatively connected with the carriage 302 for displacing the latter to the left and right as viewed in FIG. 7. The carriage 302 supports for rotation, by way of a pin 306, a roll 307 of adhesive tape, this tape 308 being guided from the supply roll 307 around a guide roll 309 and a guide pin 310 both of which are carried by the carriage 302. From the guide pin 310 the adhesive tape is guided around a further guide roll 311 connected in any suitable way with a motor which drives the roll 311 so that through this roll 311 the adhesive tape is fed. The adhesive side of the adhesive tape engages the roll 311 so that when the latter turns the adhesive tape will be fed. A stripping plate 312 is situated next to the roll 311 to make certain that the tape is stripped from the roll 311 so that the adhesive tape cannot be wound onto the roll 311. As is apparent particularly from FIG. 8A, the adhesive tape 308 is fed from the feed roll 311 through a slit 317 which is formed in a guide bar 314 which is carried by the carriage 302. A pusher 313 which also acts as a cutter is guided between the guide bar 314 and a second parallel guide bar 315. A pneumatic means 316 is operatively connected with the pusher 313 for reciprocating the latter.

In the position of the parts shown in FIGS. 7 and 8A, the carriage 302 and the pusher 313 have respectively been retracted by the means 305 and 316 to their retracted rest positions where they are most distant from the holding means 14. The adhesive tape 308 unwinds from the supply reel 307 during feeding the roller 311, with the tape of course being guided by the roller 309 and the pin 310. The fed tape is separated from the roller 311 by the plate 312 and then passes through the slit 317 so as to extent across the space between the guide bars 314 and 315 In this way a length of the tape becomes situated in front of the pusher 313. Suitable controls operate the motor which drives the feed roller 311 so that the latter is only turned to an extent sufficient to situate a portion of the tape 308 across the space between the bars 314 and 315, as illustrated in FIG. 8A. In the position of the holding means shown in FIG. 8A, the member 15 and the member 16 serve to hold in alignment a trailing end of the illustrated length of the tape 2 and a separate leader part 233 which extends to the hub 232. Thus, the holding means is shown in FIG. 8A in the trailing splicing position where the trailing end of the tape 2 is aligned with the separate leader portion 233 which extends to the hub 232. These parts 2 and 233 shown in FIG. 8A are held in the position shown in FIG. 8A by suction acting through the sintered suction plates as described above, these plates being omitted from FIG. 8A for the sake of simplicity.

In order to effect the splicing, the pneumatic means 305 is actuated, upon receiving a suitable signal, to advance the entire carriage 302 to a location relatively close to the holding means, as illustrated in FIG. 8B. Simultaneously, the pneumatic means 316 is actuated so that the pusher 313 is advanced between the guide bars 314 and 315 while cutting the part of the splicing tape 308 which extends beyond the slit 317, thus producing a splicing tape portion 271 which is pushed by the pusher 313 into engagement with the adjoining and aligned ends of the tape 2 and the leader 233 shown in FIG. 8B. While the side of the tape 308 at its portion 271 which engages the elements to be spliced may be covered entirely with adhesive, the opposite side may be provided with much less adhesive in the form of suitable spots or lines of adhesive so that the area of adhesive bonding provided by the splicing tape portion 271 is much greater than the area by which this portion 271 is held adhesively at the end of the pusher 313, so that as a result when the latter is retracted the tape 271 will adhere much more strongly to the elements 2 and 233 shown in FIG. 8B, thus assuring that the retracted pusher 313 will be separated from the splicing tape 271.

Thus, by way of the above splicing means 27 the adhesive splicing tape 271 is firmly pressed against the aligned ends of the elements 2 and 233 to form a secure splice, and thereafter the pneumatic means 305 and 316 are actuated to operate in the reverse direction so as to retract the components of the splicing means to the position shown in FIG. 7. The operation of the components 305 and 316 is such that first the pusher 313 is retracted to its initial position with respect to the carriage 302 and then the carriage 302 is retracted back to its initial position.

It is to be noted that by reason of this type of operation it is possible to utilize the direction of movement of the carriage 302 during retraction thereof for actuating a suitable cam mechanism or a suitable pinion and rack mechanism having a suitable ratchet so as to effect in this way rotary movement of the feed roll 311 through an angle required to feed the splicing tape 308 sufficiently through the slit 317 in order to situate the next length of the splicing tape across the gap between the guide bars 314 and 315. In other words the return movement of the carriage 302 after the pusher 313 has been entirely retracted can be utilized to effect through a suitable motion-transmitting mechanism rotation of the feed roller 311 through an angle sufficient to displace the end of the tape 308 already located in the slit 317 into engagement with the inner surface of the guide bar 315 which slidably engages the pusher 313. In this way one complete operating cycle for the splicing means 27 is completed.

Of course, with the above structure the pusher 313 acts also as a cutter. However it is possible to provide another embodiment where a separate cutting blade is actuated by way of a separate pneumatic cylinder-and-piston means. Such a cutting blade will act between the pusher 313 and the stripping plate 312. Inasmuch as with such an embodiment the pusher 313 is separate from the tape-cutting blade, it is possible to maintain the cutting blade sharp by separating the cutting blade from any unfavorable influence such as the frictional rubbing which exists between the pusher 313 and the guide 314.

Returning now to FIG. 6, as has been pointed out above, the holding means 14 is inclined from its normal phantom-line position shown in FIG. 6 to the splicing position 14' shown in solid lines in FIG. 6, this tilting taking place prior to the operation of the splicing means 27, so that in this way the tape 271 can be pressed perpendicularly against the parts 2 and 233 which are to be spliced together. FIG. 6 shows the extended loop 233 extending from the cassette 23 shown in FIG. 6 to the upper guideways 142 of the member 15. FIG. 6 also shows the hollow interior chambers of the member 15 which are separate from each other and which communicate with the sintered plates 147 in the guideways of the member 15, these chambers communicating through suitable tubes, as schematically shown in FIG. 6, with a source of suction, and through suitable automatically operable valves it is possible to provide and terminate suction in the chambers shown in FIG. 6. In the same way, the chamber of the member 16 communicates with a suitable source of suction which can be controlled to provide suction as required behind the sintered plate situated in the guideway 143 of the member 16.

As is apparent from FIG. 6, the holding means 14 is carried by a mounting structure 43 which has an upper plate to be directly engaged by the member 15 and 16 and a lower plate which carries a pneumatic means 44. A hollow guide tube 45 for the piston rod of the means 44 is fixed to the part of the mount 43 which engages the lower surfaces of the members 15 and 16. This hollow guide tube 45 is provided at its exterior with coaxial pins 318 extending along a common axis normal to the plane of FIG. 6, these pins which are fixed to the tubular guide 45 being situated in suitable stationary bearings which are not illustrated and which thus support the mount 43 for tilting movement about the common axis of the pins 318 so that in this way the holding means 14 can be tilted between the phantom line position and the solid line position shown in FIG. 6. The piston rod of the pneumatic means 44 is connected only to the member 15 in the illustrated example so that the member 16 does not move with respect to the mount 43 while of course being tiltable with the latter.

As is apparent from FIG. 6, the mounting structure 43 extends through a suitable opening in the panel 35.

To the other side of the panel 35 there is tiltably connected a pneumatic means 40, in the form of a suitable cylinder-and-piston assembly, and the piston thereof has its piston rod pivotally connected at 41 to the mount 43. Thus through control of the supply of air pressure to the means 40 it is possible to tilt the mount 43 about the axis of the pins 318 so as to displace the holding means 14 between the upright and tilted attitudes thereof shown in FIG. 6. A rear extension 46 of the mount 43 forms a stop means which engages a portion 42 of the panel 35 so that by way of this stop means the extent of inclination of the mount 43 is limited and the inclined position of the holding means 14 is determined. Thus, in this way the angle occupied by the holding means when it is in the position 14' is determined, and of course this angle is such that the plane occupied by the tape ends which are to be spliced together is perpendicular to the plane occupied by the splicing means 27 while of course being inclined with respect to the plane occupied by the panel 35.

Referring now again to FIG. 1, there is disclosed therein a cassette-engaging means 28 for engaging each cassette which reaches the winding position C, shown for the cassette 23c in FIG. 1, so as to precisely determine the position of each cassette at the winding position in a direction perpendicular to the path determined by the lips 32 and 32' of the support means 35'. In order to achieve a high precision in the positioning of the cassette case during splicing of the magnetic tape 2 with the leader tape which is then wound with the tape 2 into the cassette, the means 28 regulates the position of each cassette such as the cassette 23c by way of elongated metal members which are pressed downwardly against the upper surface of the cassette, as viewed in FIG. 1. Thus, the means 28 has a pair of metal fingers which through a magnetic means or the like are capable of being lowered and raised, or a suitable cam mechanism is provided for moving the positioning fingers downwardly into engagement with the upper surface of each cassette which reaches the position C, such as the cassette 23c which is shown in FIG. 1. Normally these fingers of the means 28 are raised away from the path of movement of the cassettes. At the part of the support means 35 which provides for each cassette the position C, there is a winding shaft 29 capable of entering into driving engagement with the rotary hub 231 of each cassette such as the cassette 23c which is shown in FIG. 1. This drive shaft 29 is coupled with a motor 30 by a suitable timing belt, and the drive shaft 29 is constructed so as to be capable of moving perpendicularly with respect to the plane of the panel 35, a suitable pneumatic cylinder-and-piston assembly or the like being provided for this purpose. Thus, when each cassette reaches the winding position C, the drive shaft 29 is moved into the rotary hub 231 thereof, and after the winding operation is completed the drive shaft 29 is removed from the cassette so that it is capable of then being advanced to the discharge position D shown in FIG. 1.

A stop means 31 is provided for engaging the leading end of each cassette which reaches the discharge position D. Thus, the cassette 23d is shown in FIG. 1 in the discharge position D and in engagement with the stop means 31. This stop means 31 includes a stop element for directly engaging the leading end of the cassette at position D, this stop element being carried by a lever which can be actuated by a suitable mechanism such as that indicated schematically in FIG. 1 for turning the stop means 31 to and from a position for engaging the leading end of each cassette which becomes displaced into the position D. Thus, only after the magnetic tape has been completely wound into a cassette at the winding position C, and then this cassette is conveyed to the position D by operation of the cassette-moving means 24, does the stop means 31 move downwardly, actuated by a suitable cam mechanism, for example, so as to operate to determine the positions of the several cassettes along the path determined by the support means 35'.

As has been pointed out above in connection with FIG. 2, the holding members 15 and 16 of the holding means 14 are provided at the guideways 141, 142, and 143 with the suction strips or plates 147 which communicate through suitable suction chambers in members 15 and 16 with sources of suction for holding the tapes temporarily in engagement with the holding members 15 and 16. While it is possible to use a known suction plate for this purpose, it is preferred in accordance with a further feature of the invention to utilize for each suction plate 147 a compact sintered plate provided with pores 147' having sizes in a range of from several microns to several hundreds of microns, and communicating with the exterior surface in a haphazard manner inasmuch as these pores are formed only as a result of the sintering of the particles which form the plates 147. In compacting the particles during sintering thereof, the suction plate 147 is provided with a porosity on the order of 20 - 60%, so that for a given suction plate, 20 - 60% of the volume occupied thereby is made up of free space formed by the pores. The pores 147' are substantially uniformly dispersed throughout the sintered suction plates in accordance with the particular porosity. As the tape suction plate 147 is made of a compacted sintered material; it has excellent tape-suction properties as well as wear resistance, these plates being made, for example, of bronze, stainless steel, or the like. However, it is also possible to provide porous sintered suction plates made of ferrite, porcelain, glass, plastics, or the like. As a result of experiments which have been carried out, the size of the pores 147' was most suitable when the maximum pore diameter was 20 - 90 microns, with the most ideal conditions being achieved when the size range of pores was 40 - 70 microns.

A known tape splicing structure has tape suction plates wherein a plurality of pores are formed and worked in a metallic sheet in such a way as to extend from the front surface to the back surface straight through the sheet and of course perpendicular with respect to the plane in which the tapes travel. When a vacuum suction is applied through such a plate, the part of the plate which has the pore and the part thereof which has no pore exert greatly different influences on the tape. A lack of uniformity in the suction thus exists at the tape surface, and the tape vibrates. This tendency to vibrate or flutter becomes more pronounced as the particular tape becomes thinner. Thus there is a lack of uniformity in the stripe pattern at the tape surface. Particularly in the case of magnetic tape, the magnetic film surface is sucked into the tape suction plate while the bonding or splicing surface is directed away from the suction plate, and therefore there is the disadvantage that the magnetic film surface is damaged. By utilizing a sintered compact sheet as the tape suction plate 147 for the holding means 14 of the present invention, it becomes unnecessary to provide any special pore-working operations to provide pores in the metallic sheet, and at the same time a highly suitable, uniform suction is effected without damaging the tape surface.

Referring to FIG. 6, there are illustrated therein the chambers 151 and 152 which are formed in the interior of the member 15 and which are separated from each other by an interior partition 153. These interior chambers thus communicate separately with the guideways of the member 15. Thus the upper chamber 151 communicates with the guideway 142 while the lower chamber 152 communicates with the guideway 141. These separate chambers 151 and 152 communicate respectively through suitable flexible tubes 154 and 155 with a source of suction, these tubes being separately controlled in an automatic manner by suitable valves, and of course the same is true for the interior of the member 16 which communicates with a suitable source of suction which is controlled automatically by a suitable valve and which has its interior chamber communicating with the guideway 143. These valves are automatically controlled, for example, by suitable cams on a rotary cam shaft which is turned during operation of the apparatus so as to bring about the various operations in the required sequence.

The apparatus described above operates as follows:

The magazine means 22 shown in FIG. 1 is initially loaded with a stack of cassettes 23 which have the condition shown in FIG. 4. However, slack can be taken up in the lowermost cassette in the manner described above. A cassette which reaches the loop-extracting position A, such as the cassette 23a has the initial small loop withdrawn therefrom to an extent of about 20 millimeters, as pointed out above. The magnetic tape 2 is withdrawn from the supply means and is placed along the several components 5, 7, 13 of the guide means with the leading end of the tape being placed in engagement with the lower guideway 141 of the member 15. The holding means is shown in this condition in position (1) of FIG. 10. Position (1) of FIG. 9 shows the initial cassette 23 of FIG. 4, while position (2) shows each cassette at the position A, such as the cassette 23a which has the small leader loop extracted at the position A. It is to be noted in connection with position (1) of FIG. 10 that the holding members 15 and 16 are shown in the trailing splicing position with respect to each other. Thus in this trailing splicing position the guideways 142 and 143 are in alignment while the guideways 141 and 144 are also in alignment. Assuming that the tape 2 at the supply means has a series of pieces of music or the like recorded thereon in sequence, the "Q" signal will be received by the reading means 6 so as to automatically determine starting and stopping as will be apparent from the description which follows.

The recordings made on the tape 2 are such that each recording is on a length the leading end of which becomes located at the position shown at (1) in FIG. 10. With tapes situated initially at the positions A and B shown in FIG. 1 and with the initial part of the tape 2 located with its leading end held by the holding means as shown in position (1) in FIG. 10, it is possible for the operator to push a starting button to initiate the automatic operation of the machine.

During this automatic operation the transfer means will respond to have the pin 18 extend the loop at the position B to the holding means after the pin 18 together with the pin 19 are raised from below the panel into their starting position to be received in the small loop previously extracted from the cassette. Thus, the pin 18 will move to the left, as viewed in FIG. 1 to extend the leader loop until it is received in the vertical groove 146 formed in the member 15. This is the position in which the parts are shown in position (3) of FIG. 9.

Once the parts have the position (3) of FIG. 9, the cassette-moving means 24 operates to displace the cassette from the position B to the position C, so that the parts will now have the position (4) of FIG. 9. At this time the cassette-engaging means 28 operates to place its fingers in engagement with the cassettes so as to precisely determine the position of each cassette at position C, as described above. This position is regulated within an allowance of 0.5 mm. It is important to regulate precisely the position of the cassette case at this time so as to maintain a stable travel of the magnetic tape during winding thereof into the cassette.

It will be noted from position (4) of FIG. 9 that while each cassette is displaced from the loop-extending position to the winding position the leader loop forms the three sides of a triangle with one side extending from the pin 19 parallel to the direction of movement of the cassette along support means 35' while the hypotenuse of the triangle extends along the holding means 14 up to the cassette, with the third side extending between the holding pin 19 and the transfer pin 18 which is shown in the position 18' at position (4) of FIG. 9. The result is that an elongated portion of the leader loop is initially laid into the aligned grooves or guideways 142 and 143 of the members 15 and 16. These conditions are illustrated at position (2) of FIG. 10. Thus it is possible in this way automatically to provide an arrangement where the leader loop will respond to suction acting through the plates 147 in the guideways 142 and 143 to be held by the members 15 and 16 in the position (2) of FIG. 10.

At this time the cutting means 17 is operated so that the cutting blade thereof moves along the gap 145 to separate the continuous leader into a pair of separate leaders, and the parts are shown in this latter condition at position (3) of FIG. 10. These separate leaders shown at position (3) of FIG. 10 remain held by the separate holding members 15 and 16. The leader which is to be connected with the leading end of the tape 2 is now situated in the guideway 143 of member 16 while the leader which is to be connected with the trailing end of the length of magnetic tape is held in the guideway 142 of the member 15. At this time the transfer pin 18 returns from its position 18' back to its initial position next to the holding pin 19. It will be noted that this latter pin serves to determine the length of the separate leader which is held by the member 15. The pins 18 and 19 can now return to their rest position.

At this time, the pneumatic means 44 shown in FIG. 6 is actuated to raise the member 15 with respect to the member 16 so that the parts will now reach the leading splicing position which is shown at position (4) of FIG. 10. Thus, the extent to which the member 15 is raised by the means 44 is such that the guideway 141 becomes aligned with the guideway 143, thus placing the leading end of the tape 2 in alignment with that leader which extends to the hub 231 of the cassette. With the parts in the condition shown at position (4) of FIG. 10, the turning means formed by the pneumatic means 40 of FIG. 6 is actuated to turn the mounting structure 43 about the axis determined by the pins 318 into the solid line position of FIG. 6, so that now the holding means 14 has been turned to the splicing position shown in FIG. 6 where the plane occupied by the tapes is inclined with respect to the panel 35 by an angle other than a right angle and in fact by an angle which is perpendicular to the plane in which the splicing means 27 operates. Now the splicing means 27 operates in the manner described above so as to apply the short length of adhesive tape 271 against the adjoining ends of the tapes 2 and 233, thus providing a splice as illustrated at position (5) of FIG. 10.

Upon completion of the splicing operation, the splicing means of course returns to its rest position as described above, and at the same time the means 40 acts to return the mounting means 43 and the holding means therewith to the position where the plane occupied by the tapes is perpendicular to the panel 35. Upon returning to this latter position, the valves which control the suction in the chambers which communicate with the guideways 141 and 143 are actuated so as to release the suction, thus releasing the spliced leading end of the tape 2 and the leader 233 to which it is spliced, so that now by way of the winding shaft 29 it is possible for the tape to be wound into the cassette, the guide roller 21 at this time being displaced to the position 21' to prevent rubbing of the tape against an edge of the opening 234, as described above. Thus, at this time the winding shaft 29 is in driving engagement with the rotary hub 231 and effects the winding of the tape into the cassette. During this tapewinding operation, the pinch roller 12 shown in FIG. 1 is actuated by operation of a microswitch mounted on the control cam shaft so that the magnetic tape 2 and the leader connected therewith are wound into the cassette during rotation of the motor 30. The succeeding operations are carried out with reference to the initiation of the winding in such a way that a timer set at a constant value operates the motor 4 so as to provide the desired back tension, while the pinch roller 12, the motor 11 for the capstan, and the motor 30 for carrying out the winding are automatically controlled.

During the winding the holding means will have the position (6) shown in FIG. 10.

When the next "Q" signal is detected by the magnetic head 6, the operation of the motor 4 which provides the back tension, the motor 11 for the capstan, and the winding motor 30 are automatically stopped, and the pinch roller 12 is released, so that the winding operation is terminated. Thus, the magnetic tape 2 is stopped while the holding means is in position (6) of FIG. 10.

At this time the trailing end of the length of tape to be stored in the cassette is in engagement only with the holding member 16 while the leading end of the next length of tape which is to be stored in the next cassette is in engagement with the holding member 15, the parts at this time being in position (6) of FIG. 10 as set forth above. Now the cutting means 17 is actuated by way of the pneumatic means 47 (FIG. 2), so that the tape 2 is cut by the blade 171 which moves along the gap 145, thus separating the trailing end of one length of tape from the leading end of the next length of tape, and the parts are shown at position (7) in FIG. 10 after this operation of the cutting means 17.

Thus, it will be noted that from the time that the leading end of the length of tape 2 was spliced to the separate leader during the entire winding operation until the trailing end of the length of tape 2 was cut from the leading end of the next length of tape, the holding means 14 remains in the leading splicing position shown at the positions (4) - (7) of FIG. 10. It will furthermore be noted that during this entire winding operation the other separate leader connected to the hub 232 of the cassette remains held by the holding means 15 at the upper guideway 142 thereof. Now the means 44 is actuated to return the member 15 to its initial position with respect to the member 16, which is the trailing splicing position shown in position (1) of FIG. 10, and after the above operations have been completed, when member 15 is returned to its trailing splicing position with respect to member 16, the parts will have the condition shown at position (8) in FIG. 10. Thus, the remaining separate leader is now aligned with the trailing end of the length of tape 2 which is to be wound into the cassette at the winding position C.

At this time the splicing operations are again carried out, with the turning means 40 acting to turn the holding means to the inclined position of FIG. 6 and with the splicing means 27 operating as described above to splice together the trailing end of the length of tape 2 and the remaining separate leader. After this splicing operation is completed, the parts will have the position (9) of FIG. 10.

When these final splicing operations are completed, the holding means 14 is returned to its upright position and the suction is released so that the trailing end of the tape 2 and the other leader which has just been spliced thereto are released from the holding means. If the pins 18 and 19 have not yet been moved back down to their rest positions, they are moved down at this time to a location below the panel 35 as a result of the action of the means 57 as described above and shown in FIG. 3. The winding motor 30 is now operated by the operation of a timer which is set at a required interval so that the final portion of the magnetic tape and the remaining leader which are still situated outwardly beyond the cassette case at the position C are wound into the cassette to complete the winding operation.

Now the completed cassette is advanced to the discharge position D as described above, and as shown at position (5) of FIG. 9. From the position D the completed cassette can be delivered to a suitable belt conveyor or the like, with this delivery to a belt conveyor also resulting from the operation of the cassette-moving means 24.

The next cycle of operations, identical with that described above, will now go forward. Thus, it will be noted that the leading end of the next length of tape has already been situated in the guideway 141 so as to be ready for the next cycle, as is apparent from a comparison of positions (1) and (9) of FIG. 10. Thus, during the succeeding steps the several cassettes derived from the magazine means 22 are successively delivered one by one intermittently to the loop-extracting position A where the pawl 261 withdraws the relatively small loop as described above. Then each cassette is advanced to the loop-extending position B, with all of these operations going forward in a fully automatic manner. Thus, once the cassettes are located at positions A and B with the initial end of the magnetic tape located at position (1) of FIG. 10, it is possible for the apparatus to operate in a fully automatic manner from cycle to cycle loading each cassette with the required length of magnetic tape without requiring any manual operations at any time.

While one embodiment of the invention has been described above, it is possible to provide another embodiment where the holding members of the holding means 14 are capable of carrying out a rotary movement rather than a linear movement. Thus, this second embodiment may include rotary hollow suction chambers rather than a linearly movable member such as member 15. The guideways for the tapes are provided in such rotary members so that they extend parallel to the common axis of rotation of the rotary members, and of course one of the members will have a pair of guideways while the other member only one guideway. With such an arrangement it is possible to turn the rotary members of the holding means in unison to the position where the tapes are inclined with respect to the panel of plane 35 so as to be in a plane which is perpendicular to the plane in which the splicing means 27 acts. Then after the splicing operations both of these rotary members can be turned back to the position where the tapes are in a plane which is perpendicular to the panel 35, and of course one rotary member can be turned with respect to the other to provide the leading and trailing splicing positions as described above.

An embodiment of the above type is illustrated in FIGS. 11 and 12. Referring to FIG. 11, the holding means 14 of this embodiment includes the coaxial rotary members 150 and 160. The rotary holding member 150 is supported for rotary movement by a suitable bearing means 251 while the other rotary member 160 is supported for coaxial rotary movement by a bearing means 161. The member 150 is provided with parallel grooves or guideways 241 and 242, the guideway 241 being provided for the magnetic tape while the guideway 242 is provided for the leader 233. Thus, with this embodiment the positions of the magnetic tape and leader will be the reverse of that shown, for example, at position (2) of FIG. 10 in that the magnetic tape will be situated in the upper guideway while the leader will be situated in the lower guideway. These grooves or guideways are of course parallel to the common axis of turning of the members 150 and 160. The member 150 is also formed with the circumferential groove 146 corresponding to the groove 146 of the first embodiment described above so that the loop-extending finger 18 can be received in this groove 146 in the manner described above. The member 160 is provided with the third guideway 243 for suction and travel both of the magnetic tape and leader. Of course this groove or guideway 243 also is parallel to the common axis of rotation of the members 150 and 160.

These members 150 and 160 are located closely adjacent to each other while being spaced slightly so as to provide the gap 145 for the cutting means 171. In the position of the parts shown in FIG. 11 the guideway 242 and 243 are in alignment. All of these guideways 241-243 are provided with suction plates 147 and described above. The tapes are thus set with a uniform suction force through the pores of the suction plates. These suction plates are in the form of metallic plates as described above so as to suck and hold the tapes by the suction which acts through the fine pores of the sintered metallic plate, utilizing the source of vacuum suction as set forth above.

The pneumatic means 47 cooperates with the cutting means 171 so as to raise and lower the latter. During its upward movement the cutting blade 171 will extend into the gap 145 so as to cut any tape bridging aligned guideways such as the guideways 242 and 243 shown in FIG. 11.

In the embodiment of FIGS. 11 and 12, the rotary member 150 is hollow and is provided in its interior with a transverse partition 256 providing in this way separate interior chambers 258 and 259 which respectively communicate with the sintered holding plates of the guideways 241 and 242. The chamber 258 communicates through a flexible tube 257 with the source of suction and is controlled through a suitable valve in an automatic manner as described above. The chamber 259 communicates through a hollow shaft which supports member 150 for rotary movement with a chamber 252 which in turn communicates through the tube 253 with the source of suction. In order to turn the members 150 and 160 about their common axis, pneumatic means 254 and 255 are provided. These pneumatic means include cylinders in which pistons slide, these pistons having their piston rods engaging pins which extend transversely from bars fixed to and projecting from the rotary members 150 and 160 as shown in FIGS. 11 and 12. Thus, the piston rod of each of the means 254 and 255 may be formed with a vertical slot such as the slot 260 shown in FIG. 12 for the means 254, and this vertical slot receives the pin extending from the bar which is fixed to the member 150. In the same way the means 255 cooperates with the member 160. The extent of turning required for these members is relatively small so that the relatively short slots 260 are sufficient to provide the required angle of turning.

In FIG. 12 the splicing means 27 is shown in phantom lines with FIG. 12 illustrating schematically how the splicing operations are carried out.

With this embodiment of FIGS. 11 and 12 when the loop 233 is extended up to the holding means by the transfer means, as described above, this loop 233 will extend along the aligned guideways 242 and 243. The cutting means 171 will then be actuated to provide separate leaders, and the leader which is to be connected to the leading end of the magnetic tape previously situated in the guideway 241 is now located in the guideway 243 of member 160. At this time the member 160 is turned by operation of the means 255 so as to align the leader which extends to the hub 231 with the leading end of the tape in the guideway 147. Now the splicing operations go forward as indicated in phantom lines in FIG. 12. Thus it will be seen from FIG. 12 that initially the leading end of the magnetic tape is in the inclined plane which is perpendicular to the plane of operation of the splicing means while the leader connected with the hub 231 is displaced into this inclined plane to be aligned with the leading end of the magnetic tape, whereupon the splicing operations go forward.

Upon completion of these splicing operations in the manner shown in phantom lines in FIG. 12, both of the means 254 and 255 are operated so as to turn the members 150 and 160 together without any relative rotation therebetween, to a location where the guideway 241, and of course the guideway 243 together occupy the position shown for the guideway 242 in FIG. 12. Thus, the spliced leader and leading end of magnetic tape 2 are now located in a plane perpendicular to the panel 35. Now the suction in member 160 is released, the interior thereof communicating through a flexible tube 162 with a suitable source of suction and the tube 162 is controlled by way of a suitable valve. At this time also the suction in the chamber 258 is released by actuation of a valve connected with the tube 257. The suction in the chamber 259 remains so that the other separate leader which is connected with the rotary hub 232 remains held in the guideway 242, now situated below the elevation of the guideway 243 which is in alignment with the guideway 241, and of course the transfer means can return to its starting position after the cassette 23 has been displaced along the support means 35' to the winding position C.

Upon completion of the winding operation as described above, suction is again applied to the holding plates 147 in the aligned guideways 241 and 243, and with the magnetic tape thus held the cutting means 171 is again actuated by the means 47 so as to cut the trailing end of one length of magnetic tape from the leading end of the next length of magnetic tape, these trailing and leading ends of course being situated respectively in the guideways 243 and 241 at this time. Now the means 254 and 255 are operated first to bring the members 150 and 160 back to the angular position with respect to each other shown in FIG. 11, so that the leader connected to the cassette-hub 232 now becomes aligned with the trailing end of the magnetic tape held in the guideway 243 of member 160, and the members 150 and 160 are turned so that both of these aligned guideways 242 and 243 become situated at the angular positions shown for the guideway 241 in FIG. 12, so that this trailing end of the magnetic tape and the leader connected to the hub 232 are situated in the inclined plane which is perpendicular to the plane in which the splicing means 27 acts. This splicing means is now operated to splice the trailing end of the tape in guideway 243 with the end of the leader in the guideway 242. With completion of this second splicing operation the members 150 and 160 are turned back to their original positions shown in FIG. 11, and of course the leading end of the next length of magnetic tape remains held in the guideway 241 ready for the next cycle of operations. as described above.

It will be noted that with the embodiment of FIGS. 11 and 12 the turning means 254, 255 is utilized both for providing the leading and trailing splicing positions for the holding means as well as for aligning the guideways during the winding operation, so that separate turning means are not required and the structure is therefore considerably simplified. Thus, the same turning means 254, 255 is used for simultaneously turning both of the holding members 150 and 160 between the winding and splicing positions while the member 160 is turned relative to the member 150 by the part 255 of the turning means for aligning the guideway 243 selectively with one or the other of the guideways 241 and 242.

Therefore, with the above-described embodiments of the invention the apparatus is capable of operating automatically for winding an information material such as magnetic tape into a cassette with the several cassettes being automatically fed one after the other by the cassette-moving means 24 as described above, so that the cassettes will successively reach the several positions A-B referred to above. Upon completion of one cycle of operation, the winding shaft 29 is automatically withdrawn, by actuation of a suitable timer as set forth above, from the cassette at the winding position C, and in response to withdrawal of the shaft 29, the means 24 is actuated to advance the next cassette out of the magazine means 22, advancing all of the cassettes in front of the new cassette through the required distance, with the position being determined by the stop means 31, as described above, and the next cycle goes forward automatically. This stop means 31 is of course turned away from the cassette at the position D upon withdrawal of the shaft 29 from the cassette at the position C, and the cassette displaced beyond the position D falls from the support means 35' onto a conveyer belt providing in front of the next cassette which advances into the position D a space into which the stop means 31 automatically moves to determine the position for the next cassette which reaches the position D, and of course for all of the following cassettes at the preceding positions as set forth above.

Thus, the apparatus of the invention is capable of automatically winding an information material such as magnetic tape into cassettes without requiring manual operations such as extending the leader tape in a crossed or reverse manner as is required by the prior art. In this way a high-speed automation is achieved for all of the operations including not only the splicing operations but also the winding operations. The inclination of the splicing plane of the holding means with respect to the splicing means provides a highly effective splicing operation while at the same time miniaturization is enhanced because the splicing means is situated directly over the cassette support means as described above. This automation is of course enhanced by the automatic cassette-moving means 24 as well as by the stop means 31 and the smoothness and effectiveness of the operations enhanced by the cassette-engaging means 28. Once the operations have started, it is only required for the operator to see to it that a supply of cassettes are maintained in the magazine means 22 and that a supply of information material is maintained at the supply means 1.

What is claimed is:

1. In an apparatus for manufacturing, from a cassette having a continuous leader extending between and connected to rotary cassette hubs and from a supply of elongated flexible information material which carries information capable of being extracted from said material, a cassette which has separate leaders respectively connected with said rotary hubs thereof and a length of the information material opposed ends of which are connected with said leaders, respectively, cassette-support means for supporting a cassette which initially has said continuous leader extending between and connected to said rotary hubs thereof, information material supply means for supplying information material lengths of which are respectively to be stored in cassettes, guide means having components situated along a predetermined path extending from said supply means to said support means for guiding the information material along said path from said supply means to said support means during travel of the information material into a cassette while being coiled around a hub thereof, holding means located at a splicing station which is situated along said path for temporarily holding a portion of said information material and a portion of said leader, said holding means having a leading splicing position where a leading end of a length of said information material is in alignment with an end of a separate leader connected with one of said cassette hubs and a trailing splicing position where a trailing end of said length of information material is in alignment with an end of a separate leader connected with the other hub of the cassette, cutting means situated adjacent said splicing station for cutting a continuous cassette leader loop held by said holding means into separate leaders respectively connected with said rotary hubs of said cassette, said holding means then changing from said trailing splicing position to said leading splicing position to situate the leading end of the information material in alignment with an end of one of said leaders which extends to one of said rotary hubs, splicing means situated in the region of said splicing station for splicing said leading end of said information material to said one leader, said holding means then releasing said length of information material at said leading end thereof and said one leader spliced thereto to be wound together with said length of information material into the cassette at said support means until the trailing end of the length of information material reaches said holding means, said holding means continuing to hold the other leader which extends to the other hub while said one leader together with the information material is wound into the cassette until the trailing end of said length of information material reaches said holding means, whereupon said holding means temporarily holds said trailing end of the length of information material, said cutting means then cutting the information material at said holding means to separate the trailing end of the length of information material already wound into the cassette from the leading end of the next length of information material, said holding means then returning to said trailing splicing position thereof for aligning the trailing end of the length of information material already wound into the cassette with said other leader which is still held by said holding means, while the leading end of the next length of information material remains held by said holding means, said splicing means then splicing said trailing end of the length of information material already wound into the cassette to said other leader whereupon said holding means releases said other leader and said trailing end of information material spliced thereto for completion of the winding of the information material and said other leader into the cassette, while the leading end of the next length of information material is held at said holding means in readiness to be connected with a leader of another cassette during a repetition of the above operating cycle, the improvement which comprises a transfer means movable along a second path extending between said cassette-support means and said splicing station for transferring a loop of the continuous leader from a cassette at said support means to said holding means to be temporarily held thereby while said holding means is in said trailing splicing position thereof and while said holding means holds a leading end of said information material which has travelled along said predetermined path up to said holding means, said transfer means including a loop-transfer pin and pin-moving means operatively connected thereto for moving said loop-transfer pin from a rest position first to a starting position adjacent said cassette-support means within a relatively short leader loop, then from said starting position along said second path to said splicing station for extending the loop of continuous leader from the cassette to the splicing station to be engaged and held by said holding means in preparation for being cut by said cutting means into separate leaders, then back to said starting position, and then back to said rest position, said cassette-support means supporting said cassette for movement along a third path, and cassette-moving means for moving said cassette along said third path after said pin has extended the loop into engagement with said holding means while the leader is held by said holding means, said cassette-moving means moving said cassette along a portion of said third path which forms one side of a triangle while said leader after transfer to said holding means by said transfer means extend from said holding means along a portion of said predetermined path which forms a second side of said triangle, whereby the movement of said cassette along said third path causes said leader to extend along said holding means at said portion of said predetermined path which forms said second side of said triangle, said transfer means including a holding pin connected with said pin-moving means to be moved thereby only from a rest position adjacent said transfer pin when the latter is in said rest position thereof into said relatively short loop to a starting position adjacent said transfer pin when the latter is in said starting position, with said holding pin returning with said transfer pin from the starting positions of both pins to the rest positions thereof, so that during movement of the cassette by said cassette-moving means along said one side of said triangle, a portion of the leader extends from said holding pin to said transfer pin after the latter has reached said holding means along the third side of the triangle.

2. The combination of claim 1 and wherein a panel situated in a given plane carries said supply means, said cassette-support means, said guide means, and said holding means, said holding means being turnable between a position where said information material and leader held thereby are in a plane substantially perpendicular to said panel plane and a splicing position where the information material and leader are situated in said splicing plane, with the latter being inclined at an angle other than a right angle with respect to the panel plane, said splicing means being located in a plane perpendicular to said splicing plane for advancing splicing material in said plane perpendicular to said splicing plane into engagement with information material and leader ends which are to be spliced together while the latter ends are in said splicing plane, and turning means operatively connected with said holding means for turning the latter into said splicing position to be situated therein during splicing operations and for returning said holding means to said position where said information material and leader are in a plane perpendicular to said panel plane at other times when splicing operations are not carried out.

3. The combination of claim 2 and wherein said holding means includes a pair of holding members one of which is movable relative to the other to place said holding means in said leading and trailing splicing positions thereof.

4. The combination of claim 3 and wherein said holding members are turnable about a common axis into and out of said splicing position with said turning means turning said one holding member with respect to the other to provide said leading and trailing splicing positions for said holding means.

5. The combination of claim 3 and wherein said one holding member is movable perpendicular with respect to said panel and with respect to said other holding member to provide said holding means with said leading and trailing splicing positions thereof, and means connected to said one holding member for moving the latter with respect to the other holding member to provide said leading and trailing splicing positions.

6. The combination of claim 1 and wherein said holding means includes sintered plates for holding the information material and leader said sintered plates having a porosity of 20–60%, and said holding means having in communication with said sintered plates chambers adapted to communicate with a source of suction for acting through the porous sintered plates to hold the information material and leader in engagement with the holding means by sucking the information material and leader against said sintered plates.

7. The combination of claim 2 and wherein said cassette-support means is situated between said panel and said splicing means.

8. The combination of claim 1 and wherein a magazine means for holding a stack of cassettes is situated adjacent one end of said cassette-support means, said cassette-moving means displacing a cassette from said magazine means to a loop-extracting position along said cassette-support means, said cassette-moving means then displacing a further cassette to said loop-extracting position while the latter further cassette displaces the cassette at the loop-extracting position along said cassette-support means to a loop-extending position where said transfer pin engages the relatively short loop to extend the same into engagement with said holding means, loop-extracting means situated adjacent said cassette-supporting means in alignment with a cassette at said loop-extracting position for extracting a relatively short loop from the cassette at the loop-extracting position, whereby the relatively short loop is provided at the cassette which reaches the loop-extending position, said cassette-moving means displacing a third cassette from the magazine to the loop-extracting position while the second cassette is displaced from the loop-extracting position to the loop-extending position and the first cassette is displaced from the loop-extending position to a winding position while extending the loop held by the transfer pin at the holding means from the latter along the second side of the triangle, said cassette-moving means then moving a fourth cassette to the loop-extracting position while displacing the three cassettes situated in advance of the fourth cassette along said cassette-support means respectively to the loop-extending position, winding position, and with the first cassette reaching a discharge position situated beyond the winding position.

9. The combination of claim 8 and wherein said guide means includes a movable guide roller movable to and from a position engaging the information material during winding thereof into the cassette for preventing rubbing of the information material along an edge of the cassette at an opening thereof through which the leader loop initially extended.

10. The combination of claim 8 and wherein a stop means is movable to and from a position engaging a leading end of the cassette which reaches the discharge position, for determining the positions of the several cassettes along said cassette-support means.

11. The combination of claim 8 and wherein a cassette-engaging means is movable perpendicularly to a cassette on the cassette-support means at the winding position thereof for determining the position of the cassette in the winding position in a direction which is perpendicular with respect to the third path.

* * * * *